UNITED STATES PATENT OFFICE.

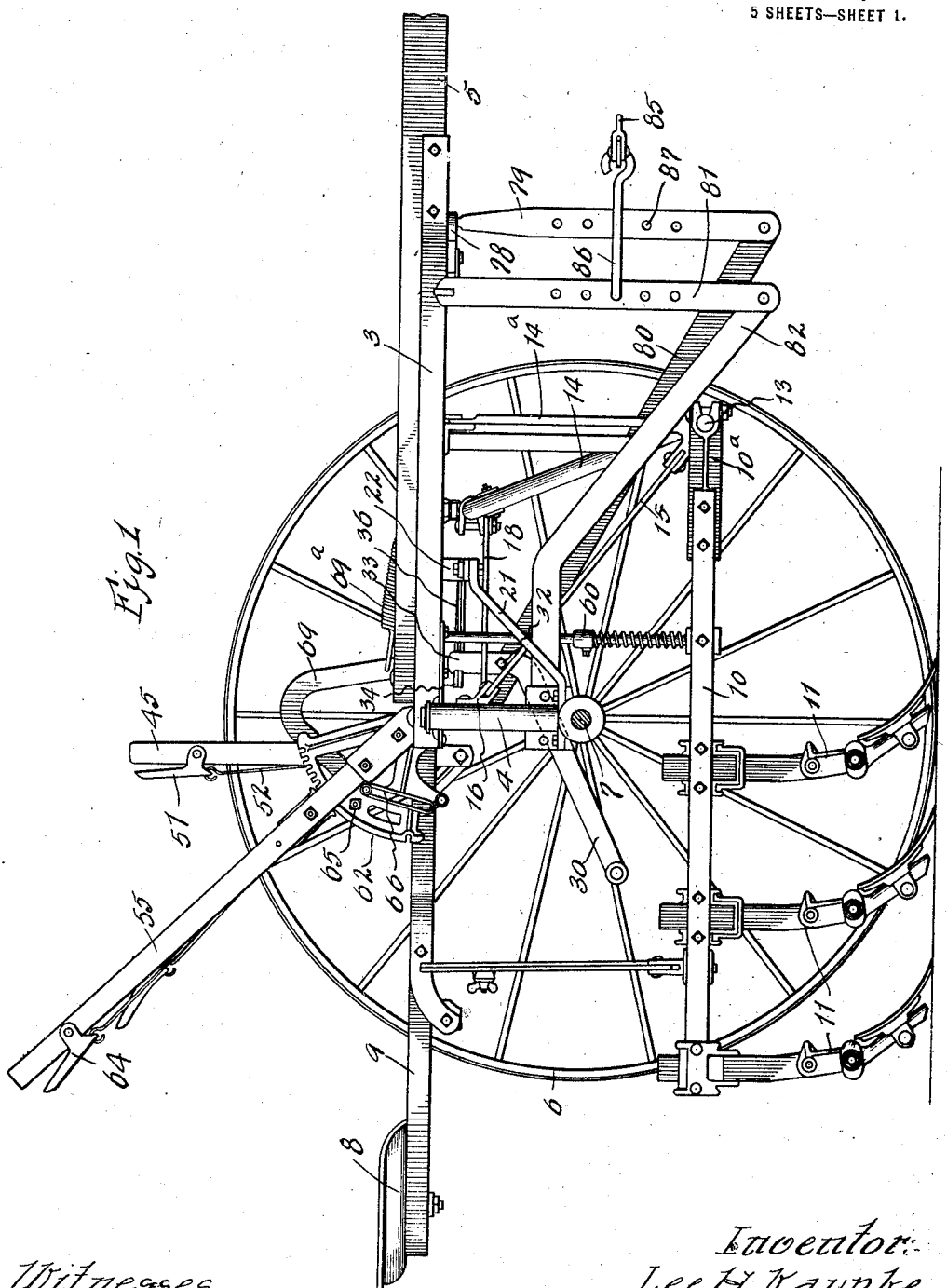

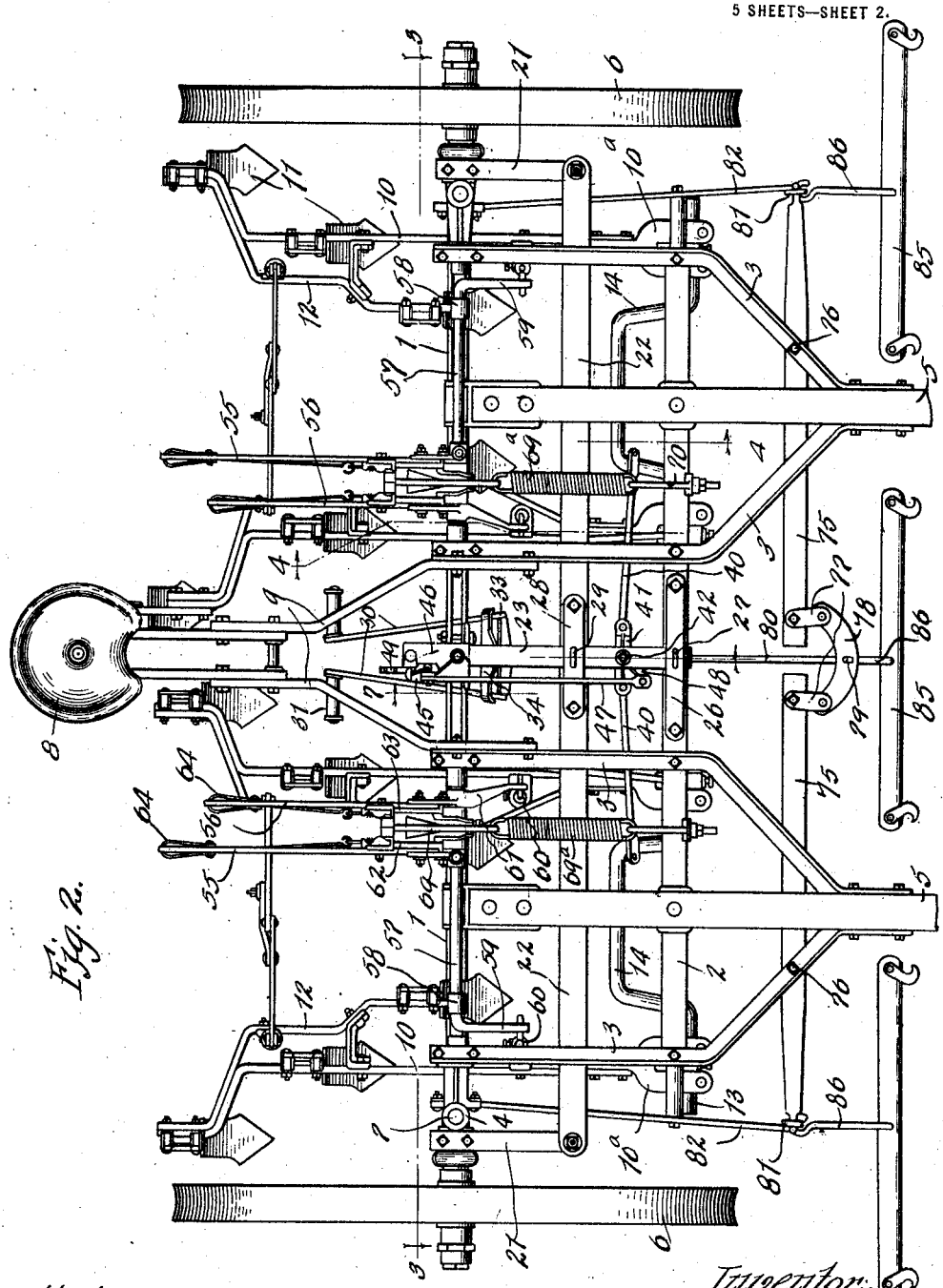

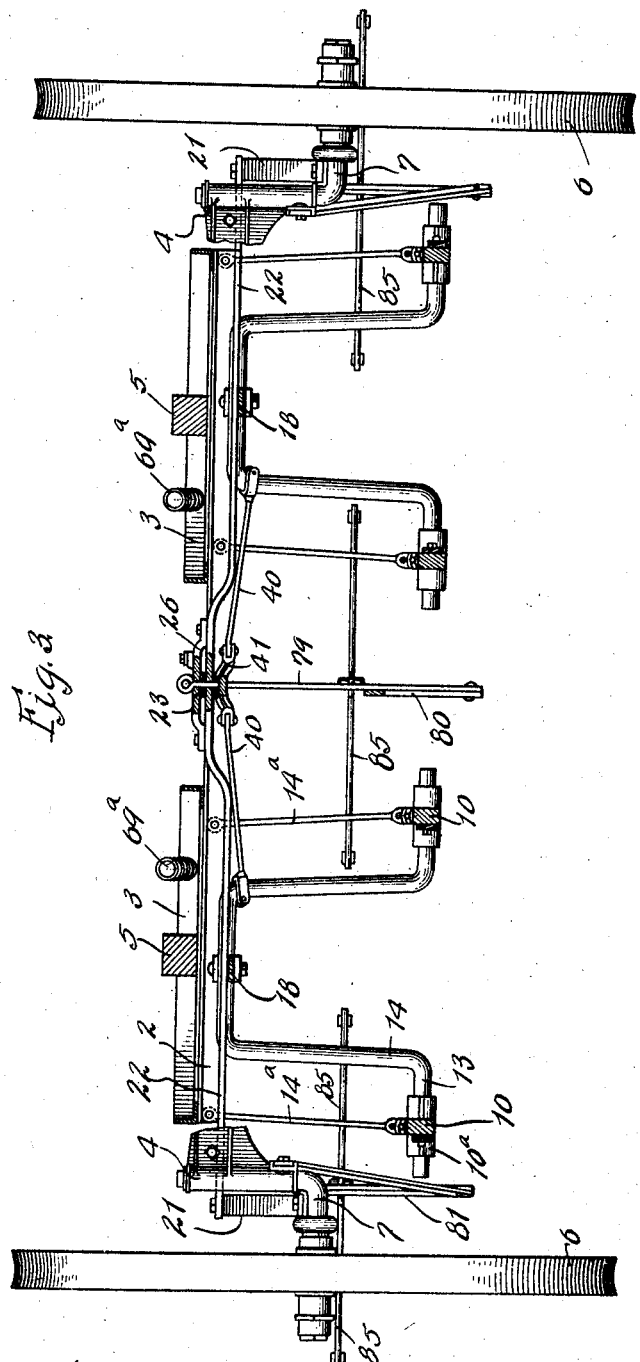

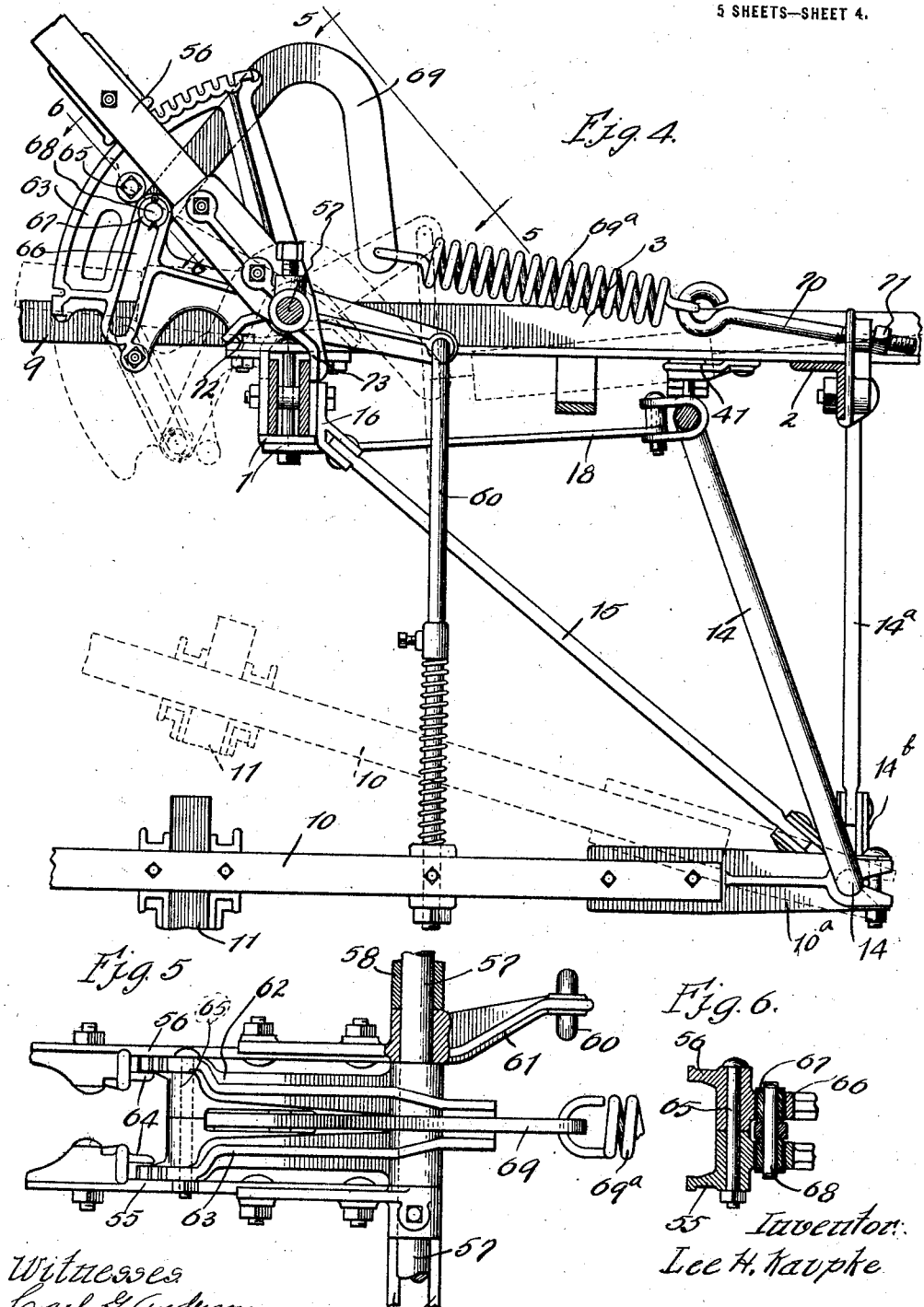

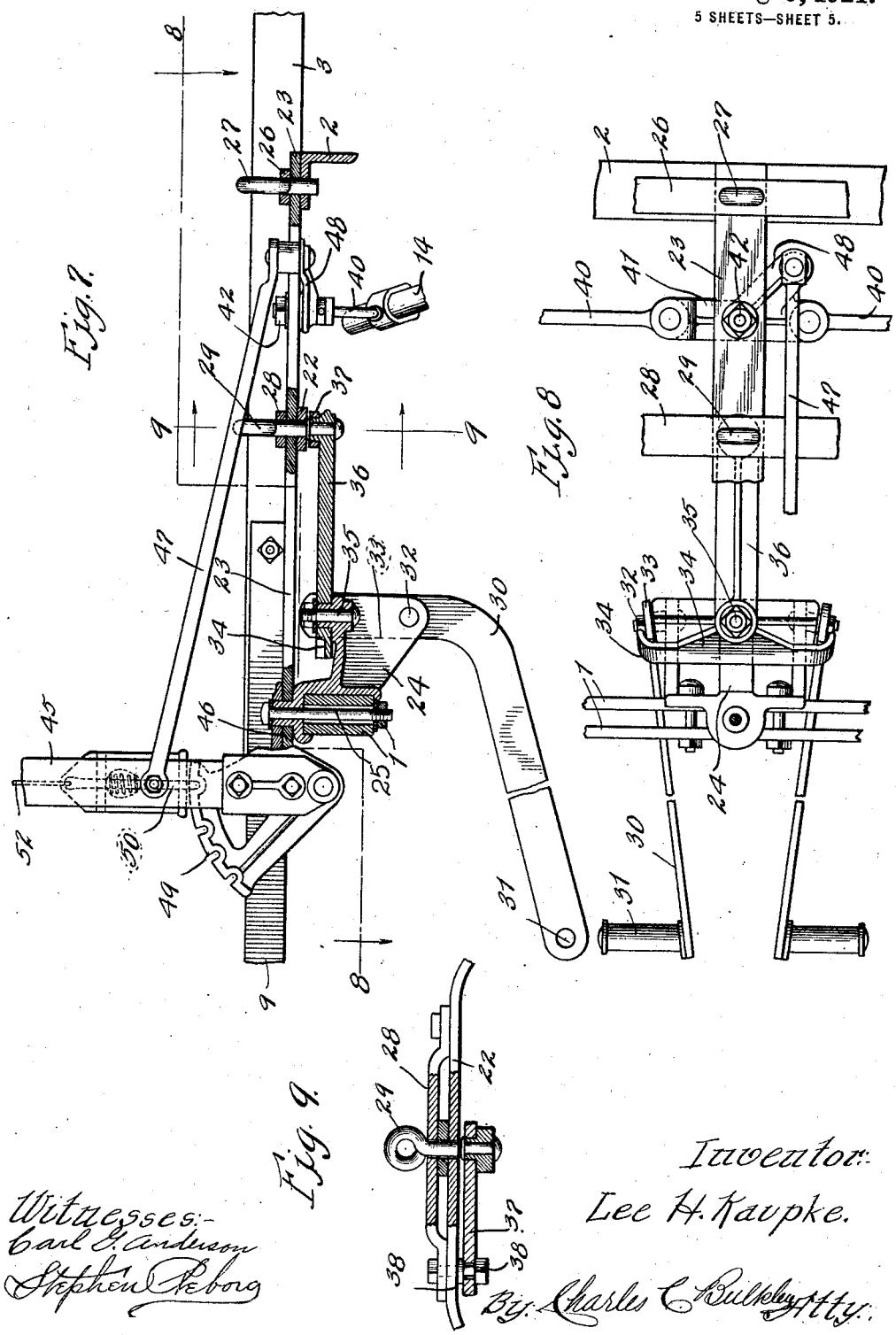

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS.

CULTIVATOR.

1,387,405. Specification of Letters Patent. Patented Aug. 9, 1921.

Application filed July 27, 1917. Serial No. 183,154.

*To all whom it may concern:*

Be it known that I, LEE H. KAUPKE, a citizen of the United States of America, and resident of Rock Island, Rock Island county, Illinois, have invented a certain new and useful Improvement in Cultivators, of which the following is a specification.

My invention relates to improvements in cultivators, and my invention concerns more particularly the cultivators of the so-called two-row type.

The object of my invention is to provide an improved structure of this type which will be simple, durable and reliable in construction, and effective and efficient in operation.

Other objects of my invention will appear hereinafter.

My invention consists in the features of novelty exemplified by the construction, combination and arrangement of parts herein described, shown in the accompanying drawings, and more particularly set forth in the appended claims.

Referring to the accompanying drawings:—

Figure 1 is a view in side elevation of an improved cultivator embodying my invention;

Fig. 2 is a top plan of said structure;

Fig. 3 is a transverse vertical staggered section substantially on the line 3—3 of Fig. 2;

Fig. 4 is a detail vertical longitudinal section on the partially indicated staggered section line 4—4 of Fig. 2;

Fig. 5 is a detail plan view of the portion embraced by the line 5—5 of Fig. 4;

Fig. 6 is a detail section on the line 6—6 of Fig. 4;

Fig. 7 is a detail section on the line 7 of Fig. 2;

Fig. 8 is a detail plan view on the line 8—8 of Fig. 7;

Fig. 9 is a detail section on the line 9—9 of Fig. 7.

The structure shown in the drawings has a horizontally disposed frame which in general comprises an axle 1, a forward transverse bar 2, and the four longitudinal braces 3. The axle comprises two flat parallel bars set on edge for strength and extending entirely across the machine. These bars are spaced slightly apart and rigidly fastened by bolts and suitable spacers at intervals. At the ends these axle bars are bolted to vertical bearing castings 4 which support the wheel axles. The forward beam 2 is parallel with the axle and is tied to the axle by the four braces 3 which are fastened thereto. Between the two outer braces on each side of the frame is a pole or tongue 5 which extends forward from the machine, the full proportionate length not being shown. These tongues are disposed to provide for three horses, this structure being of the type which employs three horses for draft purposes, and the tongues are spaced apart properly to accommodate the center horse. The tongues are fastened to the axle and forward beam, and in addition the two adjacent braces are extended diagonally forward to the tongues and serve as braces therefor. This structure provides an exceedingly strong, yet light weight, frame capable of withstanding the various stresses and distorting forces to which it is subjected.

The entire structure is supported by the large wheels 6 which are mounted on L-shaped axle members 7, the wheels being journaled on the horizontal portions and the vertical portions being journaled in the vertical castings 4 so that the wheels may be turned on vertical axes for the purpose of steering the implement through the field, as hereinafter explained.

The operator is provided with a seat 8 positioned considerably in the rear of the main axle, so that the weight of the operator will, to some extent, counterbalance the weight of the poles and parts of the machine forward of said axle, and thus relieve the horses of this overhanging weight. This seat is mounted on rearwardly extending bars 9 bolted to the two inner braces 3. The seat is far enough to the rear so that the operator has a clear forward view of the crop he is tending and all operating parts and still permit ready access to the various operating levers.

The cultivator gangs may be of any suitable type for the purpose. In the machine, they comprise in general the beams 10, each having a plurality of cultivator shovels 11 secured thereto and depending therefrom. An additional supporting member 12, forming a part of the beam, is provided, and, together with the rear end of the beam, is formed so that the shovels are staggered to position them properly with respect to the rows to be cultivated. This structure, being a two-row cultivator, has the gangs arranged in sets or pairs spaced apart and pivotally mounted at their forward ends on the lateral portions 13 of upstanding arch members 14, whereby the gangs may be raised and lowered with respect to the ground, as required in structures of this character. The forward ends of the beams have yoke castings 10ª and the forked ends of the yokes are split to embrace the laterals of the arches and are held together by bolts on said laterals, which permit the taking up of the wear. By means of this construction, the space between the gangs of the set or pair may be adjusted to suit particular operating conditions. The arches are comparatively high so as not to interfere with the corn being cultivated. The beams are suspended from the forward frame bar 2 by means of links 14ª which are pivoted at their upper ends to the frame bar, and at their lower ends to collars 14ᵇ which are fastened on the arch laterals and positioned in the yoke castings at the ends of the beams, whereby the sets of gangs may be swung laterally to vary the distance between the sets as desired. In order, however, to provide draft connections between the gangs and the frame, I provide inclined braces 15 therebetween. These braces at their lower ends are pivotally connected to the collars 14ᵇ and at their upper ends to brackets 16 which are bolted to the main axle 1. The arches are maintained in upright position by links 18 which are pivotally connected to the axle bar members and to the upper portions of said arches so as to adapt themselves to the lateral adjustment of the gangs. Thus a completely articulated structure is provided which by reason of the braces, transmits the draft power from the frame to the cultivators, and still permits the various adjustments for which the structure is designed.

The horizontal portions of the pivoted axles have forwardly and upwardly extending arms 21 rigidly fastened thereto, and these arms are connected at their forward ends by a steering bar 22 extending from one arm to the other across and pivotally connected so that the supporting wheels may be turned in unison upon their vertical axes for steering purposes. At the center of the structure is a longitudinally disposed horizontally swinging arm or lever 23, which is pivoted at its rear end on a bracket casting 24, (see Figs. 7, 8 and 9), the bracket being firmly fastened to the axle 1 by means of bolt 25. The forward end of said lever swings in a horizontal guideway or slot formed between the forward frame bar 2 and a strap 26 bolted on said bar. Through the strap 26 and frame bar are alined holes which register with a hole in the lever 23 when the lever is in central position, and into these holes a pin 27 may be inserted to lock the lever in a central position. This lever 23 also passes through a slot formed between the steering bar 22 and a short strap 28 bolted thereon, which slot permits movement of the lever 23 independently of the steering bar 22. The lever 23, however, can be locked to the steering bar 22 in a straight-ahead position of the wheels by means of a removable pin 29 which is arranged to be inserted into alined central holes in the strap 28, steering bar 22 and lever 23.

The steering operation is accomplished by means of vertically swinging foot-levers 30 which are positioned properly for the operator's feet and which are provided with convenient foot-pieces 31. These levers extend substantially horizontally rearwardly, but they are pivoted at 32 to the bracket 24 and have short upstanding arms 33 so as to form bell cranks. The upstanding short arms 33 of these foot-levers act against a short horizontally disposed cam lever 34, which cam lever is centrally pivoted upon the bracket 24 by means of a bolt 35. Thus a vertical movement of the foot-levers is converted into a horizontal movement of the cam lever 34. This cam lever has a forwardly extending arm 36 which is pivotally connected to a short link 37, which in turn is pivotally connected by means of the bolt 38 to the steering bar 22. Thus it will be observed that when the pin 29 is removed, the operator is enabled to steer the supporting wheels by operating the foot-levers, and this operation of steering can be performed independently of the gangs. It is desirable, however, under certain conditions that the operator shall be able to not only steer the wheels, but to simultaneously shift or swing the gangs horizontally as a whole and in the direction in which the implement is steered. For this purpose, I connect the arch of each set of gangs to the lever 23 by means of the pivoted links 40 and the lever 41. The links 40 are pivotally connected at their outer ends to the arches, and at their inner ends to the lever 41. The lever 41 is centrally pivoted at 42 to the lever 23. Thus, whenever the lever 23 is swung horizontally, the two sets of gangs will be swung laterally in unison. Now, when the operator desires to turn the wheels for steering purposes, and simultaneously shift the gangs laterally, he simply locks the lever 23 and the steering bar 22 together by means of the pin 29, as hereinbefore described, and any movement of the foot-levers will be transmitted to both the steering wheels and to the gangs. But as hereinbefore mentioned, when the lever 23 and steering bar 22 are unlocked, the operator may steer the wheels independently of the gangs. In such event, the gangs should be maintained in a straight-ahead position, and this is accomplished by simply locking the lever 23 to the forward frame bar 2 by means of the locking pin 27. By inserting both pins in their respective places, the wheels and gangs can be locked in position when the machine is to be transported from place to place. The operator is provided with a lever 45 which is pivoted upon a plate or bracket 46 suitably fastened to lever 23 and pivoted to the frame axle 1, and positioned just in the rear of the bracket 24. This lever is pivotally connected by a link 47 to a short arm 48 on the lever 41, so that the operation of the lever 45 will rotate the lever 41 to shift the sets or pairs of gangs relatively to each other, and thereby vary the space between the sets of gangs to adapt the machine to various operating conditions, this adjustment of the sets of gangs being independent of the lateral shifting of the gangs as a whole. This adjusting lever is arranged to be locked in its relatively adjusted position by a toothed quadrant 49 and a latch 50 adapted to engage the notches in the quadrant. The quadrant 49 is fixed on the bracket 46 which supports the manual lever, and the latch is mounted on the lever and is adapted to be actuated by the grip trigger 51 through the medium of the link 52. This relative adjustment of the sets of gangs is, as before mentioned, independent of the lateral shifting of the gangs and is not disturbed when the gangs are shifted laterally.

On each side of the operator's position, I provide two levers 55 and 56 which are mounted upon shafts 57 supported in suitable bearings 58 on the frame axle 1, and positioned just above and in parallel relation with the main axle 1. The outer ends of the shafts 57 are turned forwardly to provide arms 59 which are pivotally connected to the upper ends of suspension links 60 for the outer gangs. The lower ends of these suspension links are pivotally connected to the beams 10 of the outer gangs, and the manual levers 55 are fastened to the shafts 57 so that by rotation of the levers 55 the outer gangs may be individually raised and lowered with respect to the ground. The inner levers 56 are rotatably mounted on the ends of the shafts 57 and have forwardly extending arms 61 which are likewise pivotally connected to the upper ends of suspension links or rods 60, likewise pivotally connected to the two inner gang beams 10, whereby the operation of the levers 56 will raise and lower the inner gangs independently of each other and of the outer gangs.

This construction provides for the raising and lowering of each of the individual gangs, independently of the other gangs, for the purposes of adjustment of the working depth and level. However, the gangs can be locked in their individually adjusted positions by means of the notched quadrants 62 and 63 and the trigger latches 64 carried by each of the levers and adapted to engage the notches in the quadrants. The quadrants of each pair are positioned close together and are journaled loosely on the respective shafts 57. They are, however, rigidly fastened together by means of the bolts 65 making in effect a single member. Both quadrants of each pair have elongated slots 66 in which the rollers 67 (Figs. 4, 5, and 6), travel, and these rollers are mounted on the short shafts 68 carried by the inverted V-shaped arches or links 69. A heavy spring 69$^a$ is connected to the end of each of these arch links and is anchored to the frame beam or bar 2 by means of the eye-bolt 70 and nut 71 adjustable thereon, so that the tension of the spring may be regulated to suit the particular requirements of the mechanism. The quadrants have stop-shoulders 72 and 73 which abut against the axle bars 1, and thus determine the range of movement of the quadrants. The springs are anchored on a horizontal line through the pivotal centers of the quadrants and levers, and when the quadrants and levers are rotated in either direction sufficiently to carry the rollers past the pivotal centers in either direction, the springs act to instantly shift the rollers to the end of the slots in the quadrants, and the springs then act to assist the raising or lowering of the gangs as the case may be. By providing this shifting connection between the spring-actuated arched links and the quadrants, the springs are instantly given a more effective leverage to assist in the raising and lowering operations, thus relieving the operator of all the work except the slight amount required to move the pivotal connection past center. Furthermore, the springs act to maintain the gangs in either raised or lowered position after they have been shifted. Thus during the course of operating the machine through the field, the operator is enabled to quickly raise and lower the gangs, or either pair of them, as operating conditions require, by operating either of the hand-levers of either or both pairs. Furthermore, these operations are accomplished without disturbing the depth and level adjustments of the gangs. When lowered, the gangs will always return to their previously adjusted conditions. These adjustments are obtained, as before explained, by simply unlatching the individual levers from the quadrants and again locking them in their adjusted positions.

In a structure of this character, there is considerable weight forward of the wheel axles which cannot be entirely counter-balanced by the weight of the operator in the rear of the axle, and, furthermore, this counterbalancing weight varies with the varying weights of different operators. I provide a pendant hitch for the horses which will operate to lift this forward preponderance of weight and relieve the horses' necks thereof. I provide a pair of equalizer levers 75 which are pivoted at 76 to the outer longitudinal frame braces 3. The inner ends of the longer arms of these levers are connected together by the pivotal links 77 and connecting link 78. A central pendant link 79 is pivotally connected to the connecting link 78 at its upper end, and at its lower end to an inclined central draft link 80. The rear end of this draft link is fastened to the axle 1 of the frame. The shorter outer arms of the equalizer levers are pivotally connected to outer pendant links 81, and the lower ends of these pendant links are pivotally connected to inclined outer draft links 82. The rear ends of the latter links are fastened to the axle bearing castings 4. The swingletrees for the three horses have draft hooks 86 by which they are connected to the structure, the swingletrees 85 for the two outer horses being connected to the outer pendant links, and that for the center horse being connected to the central pendant links. These pendant links all have a vertical series of holes 87 for the draft hooks, so that the hitches may be adjusted to suit conditions. Thus, by this simple articulated structure, the power of the draft animals is applied to points which are comparatively low and the tendency is to lift the forward part of the implement, and relieve the necks of the horses of this weight, at the same time the draft is equalized among the three horses.

I claim:

1. In a cultivator, a frame, an axle, supporting wheels mounted thereon, a transversely extending steering bar connecting said wheels, foot-lever mechanism for moving said steering bar to angle said wheels, cultivator gangs mounted on said frame, a longitudinally extending arm mounted at its rear end on said axle and connected near its forward end to said cultivator gangs, means intermediate of said connections for connecting said longitudinal member to said steering bar, whereby said wheels may be angled and said gangs swung laterally simultaneously, and means for connecting the forward end of said longitudinal member to said frame to thereby lock said wheels and gangs in a straight-ahead position.

2. In a cultivator, the combination of a frame and wheels supporting said frame, a plurality of cultivator gangs pivotally supported by said frame to be raised and lowered, levers individual to the gangs for adjusting the gangs for working depth, means connecting the levers for lifting the gangs in pairs independent of said depth adjustment, a member having a shifting connection with said connecting means, and spring mechanism connected between said member and the frame for assisting in the raising and lowering operations of the pairs of gangs.

3. In a cultivator, the combination of a frame and supporting wheels therefor, a plurality of cultivator gang beams pivotally suspended at their forward ends from said frame and movable vertically, a plurality of pivoted levers individual to the gangs for raising and lowering the gangs, rotary quadrants common to the levers in pairs and adapted to be locked to the levers to raise and lower the gangs in pairs, by the actuation of either of the levers of the pair, and a spring attached to the frame and having a shifting connection with the quadrants of each pair, said connection being adapted to shift when moved past the center of rotation of said quadrant to assist the movement of said quadrants in the particular direction in which it is rotated.

4. In a cultivator, the combination of a supporting frame and wheels therefor, a plurality of cultivator gangs pivoted on the frame for vertical movement, a lever for raising and lowering each gang, pivoted on said frame, a quadrant for each lever rotatable on the frame, means for locking the lever in adjusted relation to the quadrant, means connecting the quadrants in pairs so that the actuation of either lever of the pair will raise and lower the corresponding pair of gangs, a member having a slot connection with the quadrants of each pair, and a spring alined with the center of rotation of the quadrants and connected to said member to shift the connection in the slot when moved past the center of rotation of said quadrants in either direction.

5. In a cultivator, a frame, supporting wheels therefor, a pair of vertically movable cultivator gangs supported by said frame, a shaft, connections from said shaft to one of said gangs, whereby rotation of said shaft causes said gangs to be raised, a hand lever rigidly mounted on said shaft for rotating the same, a toothed rack mounted adjacent said hand lever and loosely mounted upon said shaft, a second hand lever loosely mounted upon said shaft and connections from said second lever to said gang for raising the same, a second toothed rack associated with said second lever and loosely mounted upon said shaft, said racks being rigidly connected together, a spring tooth for each hand lever for engaging the respective toothed rack, whereby said hand levers can be held in adjusted position, and spring means for shifting the position of said toothed racks to thereby simultaneously raise said disk gangs, said spring means operating to hold said gangs in their raised position.

6. In a cultivator, a frame, supporting wheels therefor, a pair of vertically movable cultivator gangs supported by said frame, a shaft, connections from said shaft to one of said gangs, whereby rotation of said shaft causes said gangs to be raised, a hand lever rigidly mounted on said shaft for rotating the same, a toothed rack mounted adjacent said hand lever and loosely mounted upon said shaft, a second hand lever loosely mounted upon said shaft, and connections from said second lever to said gang for raising the same, a second toothed rack associated with said second lever and loosely mounted upon said shaft, said racks being rigidly connected together, a spring tooth for each hand lever for engaging the respective toothed rack, whereby said hand levers can be held in adjusted position, spring means normally holding said rack in position to maintain said cultivator gangs in their lowered position, and means controlled by either of said hand levers for shifting said spring means, whereby it operates to rotate said racks to raise said cultivator gangs, said spring means then operating to hold said gangs in raised position.

7. In a cultivator, a supporting frame, an axle, ground wheels mounted thereon, a transversely extending steering bar connected with said wheels, means for moving said bar longitudinally in order to angle said wheels, cultivator gangs pivotally mounted on said frame, a longitudinally extending arm pivoted at its rear end to said frame, a member pivotally mounted on said bar, connections from said member to said gangs, means for rotating said member to thereby move said gangs laterally with respect to each other, and means for connecting said member and arm to said steering bar whereby movement of said steering bar swings the cultivator gangs laterally of the line of draft.

Signed by me at Chicago, Illinois, the 14 day of July, 1917.

LEE H. KAUPKE.